United States Patent [19]

Keller

[11] Patent Number: 4,862,627

[45] Date of Patent: Sep. 5, 1989

[54] ICE FISHING DEVICE

[76] Inventor: Louis J. Keller, P.O. Box 66, Edgeley, N. Dak. 58433

[21] Appl. No.: 288,674

[22] Filed: Dec. 22, 1988

[51] Int. Cl.⁴ .............................................. A01K 97/12
[52] U.S. Cl. ........................................................ 43/17
[58] Field of Search ...................................... 43/16, 17

[56] References Cited

U.S. PATENT DOCUMENTS

| 885,627 | 4/1908 | Loehr | 43/17 |
|---|---|---|---|
| 3,134,186 | 5/1964 | Krueger | 43/17 |
| 3,745,689 | 7/1973 | Williams | 43/17 |
| 4,083,139 | 4/1978 | Schwend | 43/16 |
| 4,662,099 | 5/1987 | Steward | 43/17 |

Primary Examiner—M. Jordan
Attorney, Agent, or Firm—Dorsey & Whitney

[57] ABSTRACT

An ice fishing device for aiding an ice fisherman in setting or holding a fishing line over a hole in the ice, and providing a visual signal when a fish is on the line. The device is characterized by means for releaseably holding a bobber over an aperture in the device, and release and disappearance or "pop-down" of the bobber when a fish is on the line. The device insulates the hole from the atmosphere and provides for solar heating of the hole area to prevent freeze-over of the hole. Jigging of the line is also provided for by the invention.

16 Claims, 2 Drawing Sheets

ICE FISHING DEVICE

BACKGROUND OF THE INVENTION

The invention is in the field of devices for aiding an ice fisherman in setting or holding a line in a fishing position over a hole in the ice, and providing a visual signal to the fisherman when a fish is on the line. Such devices have traditionally been referred to as "tip-ups".

Many such devices have been invented and patented. Most commonly, such devices have a spring loaded arm, often with a flag attached, that is tripped and sprung upwardly to serve as a visual signal when a fish strikes the line. The fish is then pulled-in by reeling in the line. Prior art designs most typically require removing the entire device from its position over the hole to reel or pull the fish in, require repositioning of the device after the fish is caught and make resetting of the line at the same depth difficult because the original depth setting from which the fish was caught is lost when the line is reeled-in. Such devices also do not provide for use of a bobber, nor do they provide a means for jigging the line.

Prior art patents that disclose some typical ice fishing "tip-ups" include Sheraski (2,618,091), Whitacre (2,786,294), McConkey (3,474,561), Wiltse (3,698,117), Williams (3,745,689), Gonello (4,121,367), Yates (4,270,297), Wurtz (4,651,459) Stewart (4,662,099) and Fralick (4,685,240).

A problem common to most tip-up" devices is the tendency of the hole to freeze over during use. Frequent attention is required to remove slush and ice particles to prevent freeze over. Some prior art patents, such as Petersen (3,134,188), Johnson (4,253,262) and Stewart (4,662,099), have provided for insulating the hole from the atmosphere and/or generating heat by burning a combustible material such as charcoal to heat the hole area and prevent freeze over. Such devices do not provide the convenience of the present invention, however, and do not provide for the use of a bobber or the ability to jig the line. In addition, resetting the line at a constant depth is not provided for in such prior art devices.

SUMMARY OF THE INVENTION

The present invention is an ice fishing device for fishing through a hole in the ice with a hook, line and bobber secured to the line, which provides for covering and insulating the hole from the atmosphere and provide for solar heating to prevent freeze-over of the hole. The invention also provides for exposing the hole to pull a fish from the water without removing the entire device from its position over the hole. It also provides for a constant depth setting of the line and provides for a jigging action on the line, which can be imparted from a nearby or remote location.

The invention includes a rigid walled frame which has an opening substantially the same size as or larger than the hole in the ice, and which is adapted to lay flat on the ice and surround the hole. A rigid cover is hinged to the frame and covers the opening in the frame when closed. The cover has an aperture larger than the bobber so the bobber can pass through it. Means is mounted on the cover for releasably holding the bobber above the aperture. It is adapted to release the bobber when a fish strikes, allowing the bobber to pass downwardly through the aperture and hole and into the water.

A relatively rigid, but deflectable, radially-slotted sheet material is positioned over the aperture to cover the aperture thereby insulating the hole from the atmosphere, while permitting the bobber to pass through the slots when a fish strikes.

The means for releasably holding the bobber above the aperture is pivotally mounted to the cover to provide for jigging of the line.

The entire exterior surface of the device is painted black to absorb solar energy and heat the hole area.

Other features are also provided as shown in the drawings and explained below.

DESCRIPTION OF PREFERRED EMBODIMENT

Design and Construction

Figure 1:
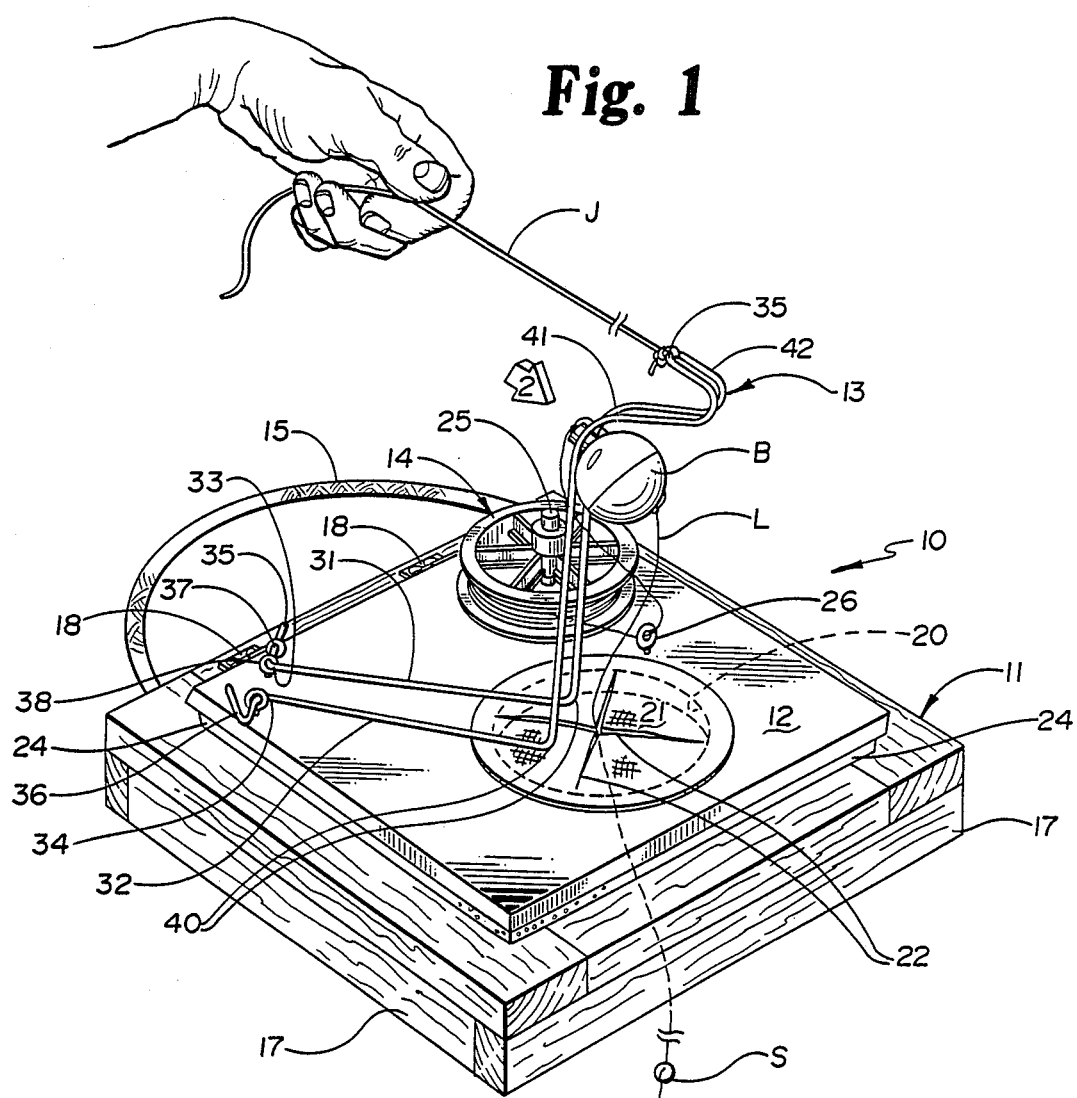
FIG. 1 is a perspective view of the ice fishing device of the present invention and shows the invention in a set-up position ready for use.
Figure 3:
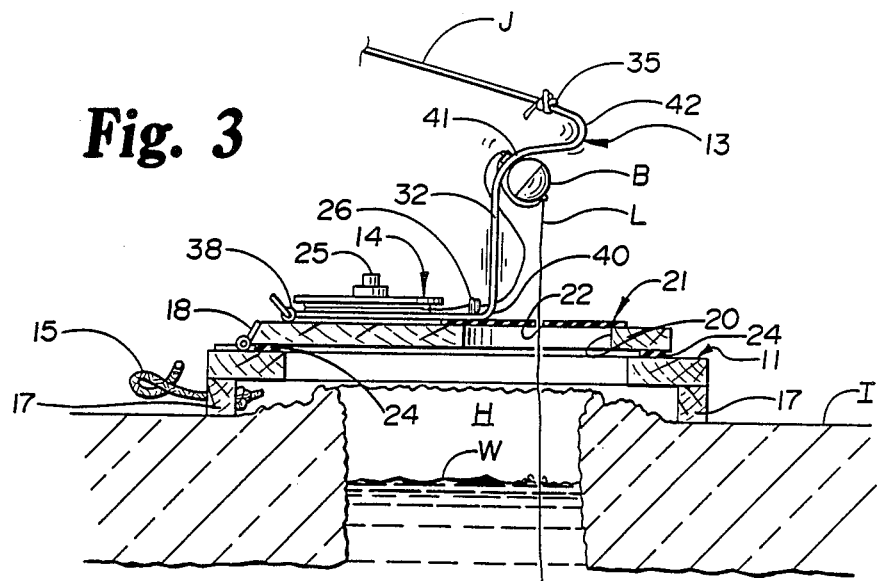
FIG. 3 is a vertical sectional view of the ice fishing device of the present invention with the invention in the set-up, jigging position over an ice fishing hole, and with the cover closed and line extending through the aperture in the cover and through the hole into the water for fishing.

The general design and construction of the preferred embodiment of the invention is shown in FIGS. 1 and 3. Ice fishing device 10 serves to releasably hold bobber, B, which is secured to line, L, above a hole, H, in the ice, I, with line, L, extending into the water, W. Sinker, S, is also secured to line, L, and a fish hook, FH, is tied to the terminal end of line, L.

Device 10 includes, as major components, a frame 11, cover 12, means 13 for releasably holding bobber, B, above hole, H, in the ice, I, and a reel 14. A carrying cord 15 is attached to one side wall of frame 11 for convenience in carrying device 10 when not in use.

Frame 11 is preferably constructed of wood, plastic or other relatively rigid, non-metallic material and forms an opening 16 surrounded by walls 17. Opening 16 is somewhat larger in transverse dimension than hole, H. Frame 11, as shown in FIGS. 3 and 4, is adapted to lay flat on the ice surface surrounding hole, H.

Figure 4:
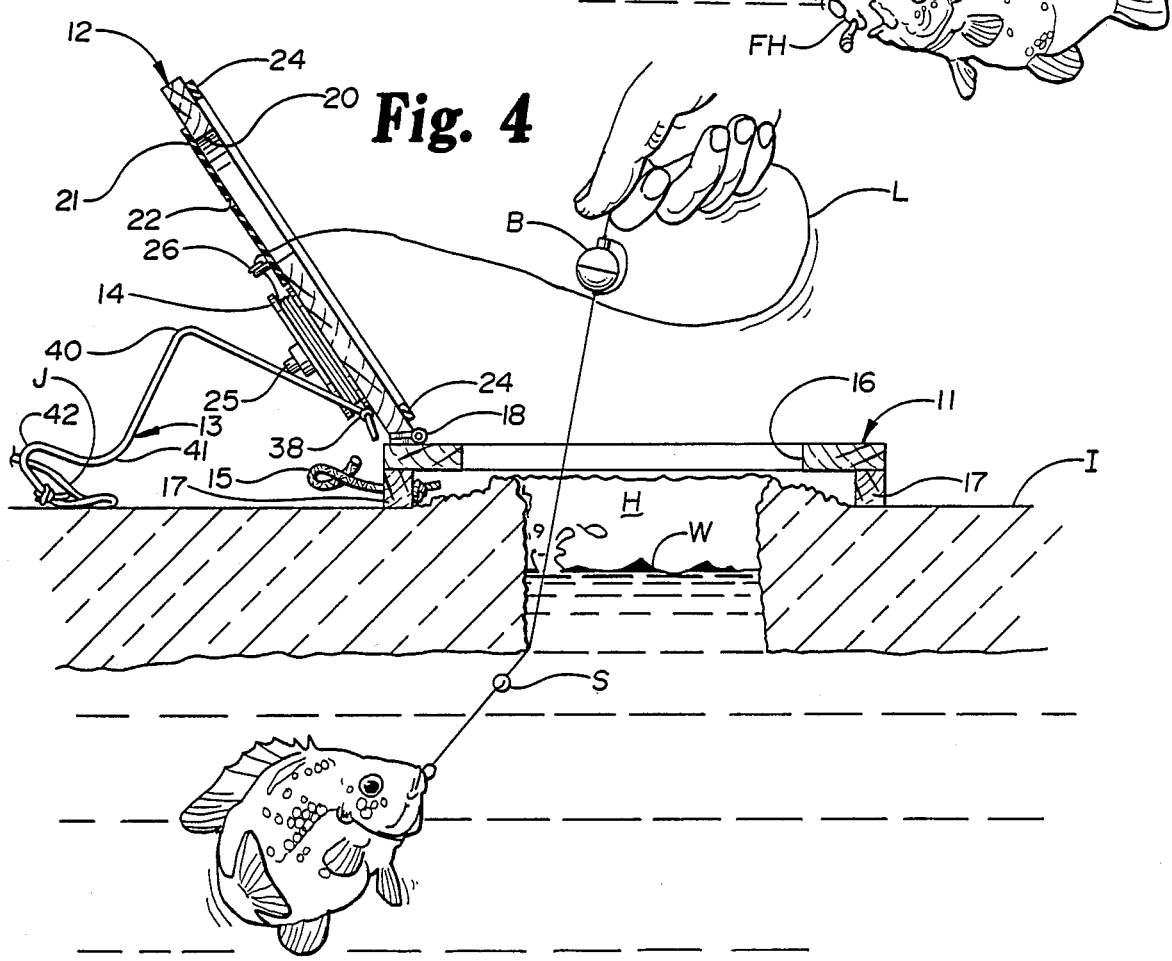
FIG. 4 is a vertical sectional view of the ice fishing device of the present invention with a fish on the line and with the cover opened, thereby exposing the hole in the ice for pulling the fish from the water.

Cover 12 is hinged to frame 11 along one edge thereof by means of hinges 18 and is movable from a closed position covering opening 16 and hole, H, as shown in FIG. 3, to an open position exposing opening 16 and hole, H, as shown in FIG. 4. Cover 12 is formed with an aperture 20, which is substantially larger than the diameter of bobber, B, and substantially smaller than the transverse dimension of opening 16. Diaphragm 21, which is formed of relatively rigid but deflectable sheet material such as rubberized canvas, is adhered to the periphery of aperture 20, covering it entirely. Diaphragm 21 is formed with radial slots 22. Radial slots 22 provide a means for line, L, and bobber, B, to pass through diaphragm 21 and aperture 20 and into water, W, when a fish strikes, as explained in greater detail below.

Sealing strip 24, formed of deformable soft rubber or closed-cell sponge material, is adhered to the side of cover 2 facing frame 11 and surrounds opening 16 in frame 11 when cover 12 is closed, thereby hermetically sealing cover 12 to frame 11 when cover 12 is in the closed position shown in FIGS. 1 and 3.

Reel 14 is mounted to cover 12 for rotation about pin 25 in a location spaced from aperture 20 and serves as a means for storing, paying-out and retrieving line, L. A line guide 26 guides line, L, from and to reel 14.

Means 13 is pivotally mounted to cover 12 for releasably holding bobber, B, above aperture 20, and is adapted to release bobber, B, downwardly when a fish strikes hook, FH. Means 13 is also adapted to provide for a jigging action on line, L, and hook, FH, all in a manner described below.

Means 13 is formed of wire which is bent to form two substantially parallel opposed legs 31 and 32, which are pivotally mounted to cover 12 at their free ends 33 and 34, and form an apex 35. Legs 31 and 32 form parallel, opposed, elongated gripping members which are biased together to releasably grip or pinch plunger, P, of bobber, B, in a manner best seen in FIG. 2, and explained in greater detail below.

Means 13 is pivotally mounted at the terminal ends 33 and 34 of wire legs 31 and 32 by bent end sections 35 and 36, which extend through the eye screws 37 and 38 mounted to cover 12. End section 36 is bent to form an elbow which serves as a stop by engaging cover 12 to thereby limit the range of pivotal movement of means 13. Means 13 is thereby pivotally mounted to cover 12 for pivotal movement about a horizontal axis spaced from aperture 20 extending through eye screws 37 and 38.

Legs 31 and 32 extend substantially parallel to each other from eye screws 37 and 38, respectively, to aperture 20, as seen in FIGS. 1 and 3, and are then bent substantially 90° upwardly forming a first bend 40. Legs 31 and 32 then extend upwardly above aperture 20 and are then bent again substantially 90° in a direction extending away from the pivotal mounting at eye screws 37 and 38 thereby forming a second bend 41. Legs 31 and 32 are bent again upwardly thereby forming a third bend 42, and terminate at apex 35.

Figure 2:
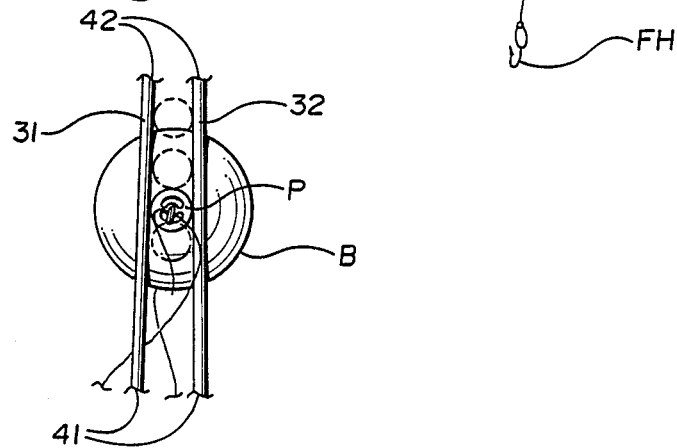
FIG. 2 is a perspective view of a section of the means for releasably gripping the bobber, shown in the set-up position of FIG. 1, taken in the direction of arrow 2 in FIG. 1.

In the distance from the vicinity of second bend 41 to third bend 42, legs 31 and 32 converge, that is, the distance between legs 31 and 32 decreases, as shown in FIG. 2, to thereby provide for adjustable gripping or pinching force on plunger, P, of bobber, B, by legs 31 and 32. This allows for a selection of release force required to release bobber, B, and line, L, from the set-up position of FIGS. 1 and 3 when a fish strikes. Gripping force is increased when plunger, P, is moved toward third bend 42 or apex 35, and is decreased when moved toward second bend 41.

A jigging line, J, may be attached to apex 35, extending in the direction of the pivotal mounting of means 13 to cover 12, so that when pulled jigging line, J, pivots means 13 upwardly about the pivotal mounting at eye screws 37 and 38, thereby jigging the line, L. It should be noted that the jigging action can be accomplished from a location remote from device 10, such as from the inside of a car parked in the vicinity of hole, H, as well as from a nearby location.

The entire exterior of device 10 is painted black to absorb solar energy and keep the device at the highest possible temperature to contribute to keeping hole, H, from refreezing. Other features of the design also contribute to preventing refreezing of the hole. These include the intimate engagement of the walls 17 of frame 11 with the ice surface, often resulting in a complete seal when the solar heated frame and walls become frozen to the ice, the hermetic seal at the iterface between cover 12 and frame 11 due to sealing strip 24, and the covering of aperture 20 by diaphragm 21. Hole, H, is thus (except for radial slots 22 in diaphragm 21) sealed from the atmosphere beneath black solar energy absorbing structure, which keeps hole, H, from refreezing and eliminates the need for repeated clearing of slush and ice particles from hole, H.

Operation

In operation, ice fishing device 10 is set up or positioned over hole, H, with cover 12 closed, as shown in FIG. 3. Bobber, B, is fixed to line, L, at the selected depth setting and is releasably fixed to means 13 with plunger, P, pinched between legs 31 and 32 as shown in FIGS. 2 and 3. The position of bobber, B, along legs 31 and 32 can be selected to yield the desired release tension on line, L. Line, L, with sinker, S, and hook, FH, is then passed through radial slots 22 in sheet material 21 and through hole, H, and into water, W, as shown in FIG. 3. Line, L, may be jigged by pulling on jigging line, J, thereby pivoting means 13 about the pivotal connection at eye screws 37 and 38, causing hook, FH, and the bait or lure associated with it to move up and down to aid in attracting a fish.

When a fish is on line, L, bobber, B, is pulled from the grip of arms 31 and 32 of means 13 by the tension in the line from the fish, and drops downwardly passing through radial slots 22 of diaphragm 21, coming to rest on water, W. Diaphragm 21 deflects for this purpose. The disappearance of bobber, B, from its set-up position above diaphragm 21 to a hidden position beneath diaphragm 21 is a clear visual signal to a fisherman that a fish is on the line, L.

To pull the fish from hole, H, cover 12 is opened as shown in FIG. 4, thus exposing hole, H. The fish can then be pulled from the water, with the only restriction on passage being the size of hole, H. After removing the fish from the line, ice fishing device 10 can be reset in the position of FIGS. 1 and 3. It should be noted that when reset, the depth of hook, FH, in water, W, will be the same as the original depth. Device 10 thus provides for resetting at a constant depth unless and until bobber, B, is repositioned on line, L.

Device 10 thus provides for sealing of hole, H, from the atmosphere and heating of the area beneath, thus preventing a refreezing of the hole common to prior art devices, while allowing for exposure of the hole, without removal of the device entirely, when a fish is to be pulled from the water. Device 10 also provides for jigging of the line from a location near to or remote from the device, provides for resetting the line at a constant depth and provides for adjustable gripping force and release tension on the line.

Having thus described the invention the following is claimed:

1. An ice fishing device for fishing through a hole in the ice with a hook, a line and a bobber secured to the line, which comprises:

a. a rigid, walled frame defining an opening substantially the same size or larger than the hole in the ice and adapted to lay flat on the ice surrounding the hole;

b. a rigid cover hinged to the frame and adapted to cover the opening in the frame when closed and expose the opening when opened, with an aperture therein larger than the bobber, thereby allowing the bobber to pass through the aperture; and c. means mounted to the cover for releasably holding the bobber above the aperture, adapted to release the bobber downwardly through the aperture when the line extends through the aperture and a fish strikes the hook.

2. The device of claim 1 and a relatively rigid, radially-slotted diaphragm covering the aperture, adapted to allow the line and bobber to pass through the diaphragm and aperture when the bobber is released downwardly.

3. The device of claim 1 wherein the means for releasably holding the bobber above the aperture is pivotally mounted to the cover to thereby provide for pivotal movement thereof and a jigging action on the line.

4. The device of claim 1 wherein the means for releasably holding the bobber above the aperture consists of parallel, opposed, elongated gripping members biased together for frictionally gripping the bobber.

5. The device of claim 1 wherein the exterior surface of the frame and cover are black.

6. The device of claim 1 and deformable sealing means extending continuously around the opening at the interface between the frame and cover, thereby hermetically sealing the cover to the frame when the cover is closed.

7. The device of claim 1 and a reel mounted to the cover for storing, paying-out and retrieving the line.

8. The device of claim 2 wherein the means for releasably holding the bobber above the aperture is pivotally mounted to the cover to thereby provide for pivotal movement thereof and a jigging action on the line.

9. The device of claim 3 wherein the means for releasably holding the bobber above the aperture consists of parallel, opposed, elongated gripping members based together for frictionally gripping the bobber.

10. The device of claim 4 wherein the exterior surface of the frame and cover are black.

11. The device of claim 5 and deformable sealing means extending continuously around the opening at the interface between the frame and cover, thereby hermetically sealing the cover to the frame when the cover is closed.

12. The device of claim 6 and a reel mounted to the cover for storing, paying-out and retrieving the line.

13. The device of claim 9 wherein the means pivotally mounted to the cover for releasably holding the bobber above the aperture comprises a wire bent to form two substantially parallel opposed legs joined at an apex, and said means:

a. is pivotally mounted to the cover at the free ends thereof for pivotal movement about a horizontal axis spaced from the aperture;

b. extends from the pivotal mounting to the aperture;

c. is bent at the aperture substantially 90° thereby forming a first bend extending upwardly therefrom; and d. is bent again above the aperture substantially 90° thereby forming a second bend extending away from the pivotal mounting and terminating at the apex thereof.

14. The device of claim 13 wherein the distance between the legs of the wire decreases between the second bend and the apex, thereby providing for varying frictional gripping force on the bobber depending upon where the bobber is gripped between the legs along the distance between the second bend and the apex.

15. The device of claim 14 wherein the wire legs are bent again upwardly thereby forming a third bend terminating at the apex thereof.

16. The device of claim 15 and a line attached to the apex for pulling the apex toward the pivotal mounting thereby pivoting the means for releasably holding the bobber above the aperture causing a jigging action on the line.

* * * * *